(12) United States Patent
Brogdon et al.

(10) Patent No.: US 8,001,248 B1
(45) Date of Patent: Aug. 16, 2011

(54) SYSTEM AND METHOD FOR PROVIDING QUALITY OF SERVICE TO DSL INTERNET CONNECTIONS

(75) Inventors: Jonathan Brogdon, Round Rock, TX (US); Andrew M Spooner, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 1027 days.

(21) Appl. No.: 09/905,447

(22) Filed: Jul. 13, 2001

(51) Int. Cl.
*G06F 15/16* (2006.01)
*H04L 12/28* (2006.01)

(52) U.S. Cl. ............ 709/227; 709/228; 370/395.21

(58) Field of Classification Search .......... 709/220–224, 709/227, 228, 249; 370/254, 395.2, 395.21
See application file for complete search history.

(56) References Cited

U.S. PATENT DOCUMENTS

| | | | |
|---|---|---|---|
| 5,917,822 A | 6/1999 | Lyles et al. | 370/395 |
| 6,058,114 A * | 5/2000 | Sethuram et al. | 370/397 |
| 6,104,700 A * | 8/2000 | Haddock et al. | 370/235 |
| 6,104,713 A | 8/2000 | Nagami et al. | 370/392 |
| 6,175,569 B1 * | 1/2001 | Ellington et al. | 370/401 |
| 6,188,698 B1 | 2/2001 | Galand et al. | 370/412 |
| 6,216,171 B1 | 4/2001 | Isono et al. | 709/250 |
| 6,222,844 B1 | 4/2001 | Han et al. | 370/397 |
| 6,223,222 B1 * | 4/2001 | Fijolek et al. | 709/227 |
| 6,252,857 B1 | 6/2001 | Fendick et al. | 370/254 |
| 6,259,699 B1 | 7/2001 | Opalka et al. | 370/395 |
| 6,289,381 B1 | 9/2001 | Brodigan | 709/225 |
| 6,304,578 B1 | 10/2001 | Fluss | 370/413 |
| 6,351,773 B1 | 2/2002 | Fijolek et al. | 709/228 |
| 6,366,577 B1 * | 4/2002 | Donovan | 370/352 |
| 6,467,090 B1 | 10/2002 | Brodigan | 725/87 |
| 6,546,017 B1 | 4/2003 | Khaunte | 370/412 |
| 6,636,505 B1 * | 10/2003 | Wang et al. | 370/352 |
| 6,650,644 B1 | 11/2003 | Colley et al. | 370/395.21 |
| 6,693,912 B1 * | 2/2004 | Wang | 370/401 |
| 6,714,545 B1 * | 3/2004 | Hugenberg et al. | 370/395.1 |
| 6,728,365 B1 * | 4/2004 | Li et al. | 379/329 |
| 2002/0041590 A1 * | 4/2002 | Donovan | 370/352 |
| 2002/0143948 A1 * | 10/2002 | Maher et al. | 709/226 |
| 2002/0159462 A1 * | 10/2002 | Demaria et al. | 370/395.1 |
| 2003/0074443 A1 * | 4/2003 | Melaku et al. | 709/224 |
| 2004/0030797 A1 * | 2/2004 | Akinlar et al. | 709/232 |

OTHER PUBLICATIONS

Tim Hale and Cam Cullen, "Mapping Ethernet CoS to ATM QoS", Jun. 21, 1999, Retreived from http://www.nwfusion.com/reprints/0621tech.html on Sep. 14, 2004.*

(Continued)

*Primary Examiner* — Aaron Strange
(74) *Attorney, Agent, or Firm* — Baker Botts L.L.P.

(57) ABSTRACT

A method and system provides quality of service in a DSL network interfaced with the Internet. A connection engine determines whether a connection from an internet endpoint has an associated IP layer 3 quality of service or ATM layer 2 quality of service and provides the internet network quality of service parameters to a mapping engine. The mapping engine references a quality of service map to associate the layer 3 or layer 2 quality of service with a DSL layer 1 quality of service. The mapping engine provides the DSL quality of service parameters to the DSL network which establishes the DSL connection between a DSL endpoint and the internet endpoint with the appropriate quality of service. To provision services to a DSL network, the quality of service map is updated to associate quality of service parameters for the service, including its association with other network quality of service parameters.

31 Claims, 1 Drawing Sheet

OTHER PUBLICATIONS

Kalyan Kidambi, "Reaching for the Heights: The High Hurdle of QoS", Sep. 15, 1999, Retreived from http://www.x-changemag.com/articles/992feat3.html on Sep. 14, 2004.*

Luiz A. DaSilva, "QoS Mapping along the Protocol Stoack: Discussion and Preliminary Results", 2000, Proceedings of the 2000 IEEE International Conference on Communications (ICC 2000), Jun. 18-22, 2000, vol. 2, pp. 713-717.*

* cited by examiner

SYSTEM AND METHOD FOR PROVIDING QUALITY OF SERVICE TO DSL INTERNET CONNECTIONS

TECHNICAL FIELD OF THE INVENTION

This invention relates generally to computer networks, and more specifically relates to a system and method for providing quality of service to a DSL network interfaced with the Internet.

BACKGROUND OF THE INVENTION

The Internet has grown in popularity largely due to its ability to exchange data in a uniform and simple manner. The internet transfers TCP/IP packets so that the networking hardware infrastructure for accomplishing packet transfers has minimal impact on the data carried by the packets. Thus, a wide variety and diversity of underlying hardware and software infrastructure will support data transfers over the Internet with TCP/IP packets. However, the simplified nature of the internet's transfer of data with packets makes specific control of data flows difficult to accomplish since the packets generally do not carry specific handling instructions for infrastructure to use. The lack of control instructions in internet packets tends to make the internet less flexible for applications that have specific data transfer requirements, such as services for providing voice and video flows.

To address the use of specific applications across the internet, industry has proposed a variety of quality of service standards. The quality of service standards provide a basis for identifying packets of data so that the packets can be handled through network infrastructure to achieve desired data transfer parameters. For instance, data packets associated with a quality of service may be identified by a layer 1 digital subscriber line (DSL) quality of service parameter for handling by DSL infrastructure, a layer 2 asynchronous transfer mode (ATM) quality of service parameter for handling by ATM infrastructure, or a layer 3 internet protocol (IP) quality of service parameter for handling by IP infrastructure. In each instance, the underlying infrastructure handles data packets to achieve a predetermined quality of service that is typically associated with applications, such as voice over IP or video streaming.

One difficulty with using quality of service parameters is that each infrastructure layer is typically limited to handling quality of service parameters associated with that layer and thus is typically unable to provide quality of service for data packets having quality of service parameters in other layers. Thus, a network that provisions a service may assign packet flows to a layer 2 or layer 3 quality of service that bears no relation to a provisioned layer 1 quality of service. This tends to result in non-optimized quality of service and may in fact degrade services provisioned in the layer 2 or layer 3 infrastructure.

SUMMARY OF THE INVENTION

Therefore a need has arisen for a system and method which provides quality of service in a layer 1 DSL network which is consistent with quality of service for layer 2 and layer 3 network infrastructure.

A further need has arisen for a system and method which provisions services to a DSL network so that quality of service is provided in a consistent manner with associated internet networks having ATM and IP infrastructure.

In accordance with the present invention, a system and method is provided that substantially eliminates or reduces disadvantages and problems associated with previously developed systems and methods for providing quality of service on a DSL network. Upon receiving a request to establish a connection between a DSL endpoint and an internet endpoint, the DSL network determines a quality of service parameter associated with the request and the internet endpoint, maps the quality of service parameter to a DSL quality of service parameter, and establishes the connection between the DSL endpoint and internet endpoint by applying the mapped DSL quality of service parameter at the DSL network.

More specifically, a digital subscriber line access multiplexer (DSLAM) supports interfaces between one or more DSL endpoints and one or more internet endpoints. A quality of service map associated with the DSLAM relates DSL quality of service parameters and internet network quality of service parameters. A mapping engine associated with the DSLAM applies the quality of service map to determine a DSL quality of service parameter for a requested connection between the internet endpoint and the DSL endpoint. For instance, when a request to establish a connection with a DSL endpoint is received at a DSLAM, a connection engine associated with the DSLAM determines if the connection request is from a network having a layer 3 internet protocol quality of service or layer 2 asynchronous transfer mode quality of service and, based on the type of connection, maps the network quality of service to a layer 1 DSL quality of service.

In one embodiment, when a service is provisioned to a network, the mapping engine automatically updates the quality of service map by storing mapping information to associate the provisioned service's connection type with one or more internet network quality of service parameters and one or more DSL quality of service parameters. For instance, layer 2 and 3 quality of service parameters include different levels of cell delay, cell delay variation, and cell loss for different types of packet flows, such as voice, video and data. These layer 2 and 3 quality of service parameters are mapped to corresponding layer 1 DSL quality of service parameters to achieve the desired quality of service for the DSL network.

As an example, a quality of service parameter for voice data flows has a greater tolerance for cell loss than a quality of service parameter for video data flows. Thus, the mapping engine detects the data flow type, such as a voice or video data flow type, and associates DSL quality of service parameters mapped to the network quality of service parameters. For voice and video data flows, network quality of service parameters for cell delay are mapped to DSL quality of service parameters for bit rate, latency delay, path selection and queue sizes, and network quality of service parameters for cell loss are mapped to DSL quality of service parameters for channel margin, interleave delay and redundancy, and path selection. Once a DSL network interfaces a connection with an internet network, such as an ATM or IP network, the DSL quality of service parameters aid in the transfer of data packets over the connection in a manner consistent with the desired quality of service.

The present invention provides a number of important technical advantages. One example of an important technical advantage is that quality of service parameters between the DSL layer 1 and other layers are automatically related so that a desired quality of service for data flow types is provided. The relationship between quality of service parameters in different layers improves the optimization of services provisioned to the network.

Another example of an important technical advantage of the present invention is that a network operator is able to provision a service to a network without specific knowledge of quality of service parameters for layer 1 DSL quality of service. By updating the quality of service map to associate DSL quality of service parameters with other network quality of service parameters, the separate identification of DSL quality of service parameters at the provisioning of a service is automated.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Preferred embodiments of the present invention are illustrated in the figures, like numerals being used to refer to like and corresponding parts of the various drawings.

The internet's simplicity and use of a uniform protocol has made it a popular vehicle for supporting a wide array of applications. However, the internet's simplicity has also impeded the wide acceptance of applications that use specific handling of packet flows since it is difficult to control how data is transferred within the internet's infrastructure. For instance, voice over internet protocol provides an inexpensive way to support telephone communications but generally does not offer high quality communications due to delays in packet transfers often experienced with the internet. To overcome the difficulty of controlling data transfers, the industry has developed quality of service parameters that aid in setting up connections across the internet. Although these quality of service parameters offer a means for achieving desired internet connection quality, difficulty remains in integrating infrastructure specific quality of service parameters among different types of internet hardware and software infrastructure.

Figure 1:
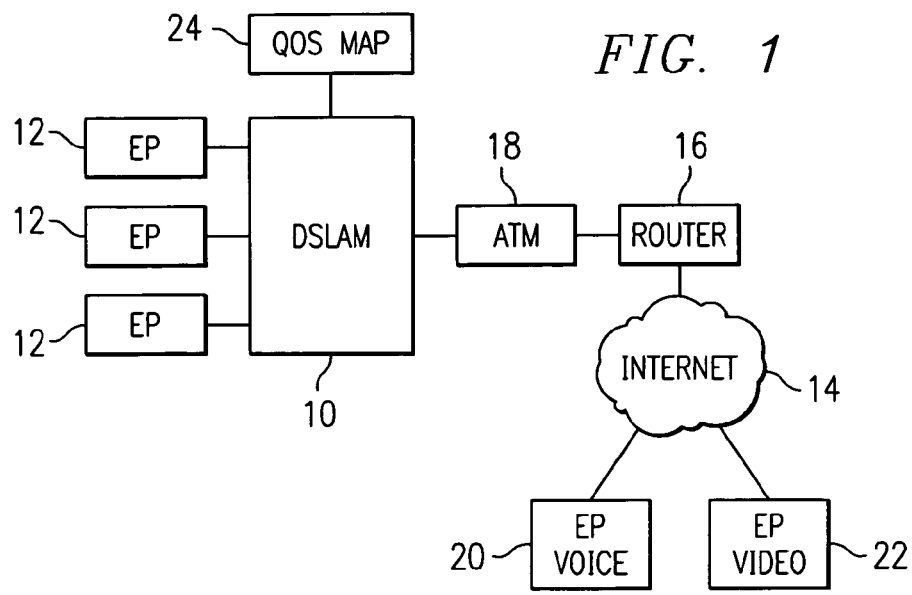
FIG. 1 depicts a block diagram of a DSL network interfaced with the internet.

Referring now to FIG. 1, a block diagram depicts a DSL network interfaced with the internet. A DSLAM 10 provides a DSL interface for plural DSL endpoints 12. DSLAM 10 maintains a constant hardwire interface with DSL endpoints 12 by communicating data according to DSL standards and then establishes connections to exchange packet flows between the DSL endpoints 12 and the internet 14. Generally, the internet 14 routes traffic with routers 16 based on the Internet Protocol. Data packets are also exchanged with asynchronous transfer mode switches 18 using ATM protocols.

Each of the DSL, ATM and router hardware and software infrastructures are able to apply quality of service parameters associated with packets being transferred so that the packets are handled in a predetermined manner. However, the quality of service parameters and their impact on the handling of packets differs depending upon the underlying infrastructure involved. For instance, a voice endpoint 20 seeking to establish a voice connection with a DSL endpoint 12 provides routers 16 with an IP layer 3 quality of service parameter and ATM switches 18 with an ATM layer 2 quality of service parameter. The layer 3 and 2 quality of service parameters identify packets associated with the voice data flow so that those packets are handled to decrease transfer delays. Similarly, video endpoint 22 provides quality of service parameters so that packets associated with the video data flow have reduced data loss to maintain the quality of the video. To achieve the desired packet handling, the IP and ATM quality of service parameters identify packet flows so that routers and ATM switches achieve desired cell delay, cell delay variation, peak cell rate and cell loss. However, these IP and ATM quality of service parameters do not directly correspond to DSL quality of service parameters or the handling of packets by DSL infrastructure.

In order to provide a consistent quality of service for connections into DSLAM 10, a quality of service map 24 maps IP layer 3 and ATM layer 2 quality of service parameters to layer 1 DSL quality of service parameters. Requests for connections with DSL endpoints 12 received at DSLAM 10 are assessed to determine whether the data flow of the requested connection will have a quality of service. If either a layer 3 IP quality of service or a layer 2 ATM quality of service is detected at DSLAM 10, then quality of service map 24 is referenced to determine the layer 1 DSL quality of service that is associated with the connection request. Once a layer 1 DSL quality of service is identified, the connection is established through the DSLAM 10 with the appropriate DSL quality of service parameter or parameters.

Figure 2:
FIG. 2 depicts a block diagram of a DSLAM interfaced with a quality of service map.

Referring now to FIG. 2, a block diagram depicts the interaction between DSLAM 10 and quality of service map 24. A connection request from internet 14 is detected by connection engine 26 to determine any quality of service parameters associated with the connection. The determination is accomplished by identifying the type of connection requested, such as connections with a layer 3 or 2 quality of service or connections for specific applications like voice, video and data packet flows. Any detected quality of service parameters are provided to mapping engine 28 which queries quality of service map 24 to determine the layer 1 DSL quality of service parameters associated with the connection request. Mapping engine 28 provides the layer 3 IP quality of service parameter or layer 2 ATM quality of service parameter to quality of service map 24, either by determining quality of service parameters associated with the request or by determining appropriate parameters from the type of packet flow associated with the request. Quality of service map 24 determines the layer 1 DSL quality of service parameter associated with the quality of service for the connection request by looking up the layer 1 parameter that is mapped to the determined layer 3 or 2 parameter. Mapping engine 28 then provides the layer 1 DSL quality of service parameters to endpoint interface 30 which establishes the connection at the appropriate DSL quality of service.

In one embodiment, mapping engine 28 and quality of service map 24 aid in the provisioning of new services to a network. For instance, a network operator deploying a service to a network that uses DSL, ATM and internet router infrastructure is able to avoid provisioning quality of service parameters for each layer of the infrastructure by instead updating quality of service map 24 when the service is provisioned. As an example, a voice packet flow typically withstands some loss of data without substantial degradation of the voice signal due to the generally high sample rate used when the voice signal is initially digitized but suffers substantial degradation when the packets of the flow are delayed. Thus, when a voice service is provisioned to the network, the layer 3 and 2 quality of service is generally set to optimize cell delay and cell delay variation with less optimization for cell loss. Quality of service map 24 is updated to reflect the voice service by mapping the voice layer 3 and 2 quality of service parameters for cell delay to DSL layer 1 parameters for bitrate, latency delay, path selection and queue size. Similarly, the voice layer 3 and 2 quality of service parameters for cell loss are mapped to DSL layer 1 parameters for channel margin, interleave delay and redundancy, and path selection. Updating quality of service map 24 to reflect the voice service reduces or even eliminates the need for provisioning the service to the DSL network, simplifying the use of the service for the network operator. Other services include video, which generally requires greater optimization of cell loss to reduce degradation of video signals between interleaved downloads, and data which has reduced sensitivity to cell delay, as well as any application that uses quality of service parameters to aid in the control of packet flows.

Although the present invention has been described in detail, it should be understood that various changes, substitutions and alterations can be made hereto without departing from the spirit and scope of the invention as defined by the appending claims.

What is claimed is:

1. A method for providing quality of service in a DSL network, the method comprising:
  receiving a request at the DSL network to establish a network connection between a DSL endpoint associated with the DSL network and an Internet endpoint;
  determining a network quality of service parameter associated with the request and the Internet endpoint, wherein the determining of the network quality of service includes determining if the request is from a network having a layer 3 IP quality of service or a layer 2 ATM quality of service;
  mapping the network quality of service parameter to a DSL quality of service parameter based on a connection type, wherein the mapping operation correlates the DSL quality of service parameter to layer 2 and layer 3 network quality of service parameters, and wherein the layer 2 and layer 3 network quality of service parameters comprise at least one of cell delay, cell delay variation, and cell loss; and
  establishing the network connection between the DSL endpoint and the Internet endpoint by applying the DSL quality of service parameter at the DSL network.

2. The method of claim 1 wherein the network quality of service parameter comprises an IP quality of service parameter.

3. The method of claim 1 wherein the network quality of service parameter comprises an ATM quality of service parameter.

4. The method of claim 1 wherein the network quality of service parameter comprises a cell delay parameter and the DSL quality of service parameter comprises a bit rate parameter.

5. The method of claim 1 wherein the network quality of service parameter comprises a cell delay parameter and the DSL quality of service parameter comprises a latency delay parameter.

6. The method of claim 1 wherein the network quality of service parameter comprises a cell delay parameter and the DSL quality of service parameter comprises a path selection parameter.

7. The method of claim 1 wherein the network quality of service parameter comprises a cell delay parameter and the DSL quality of service parameter comprises a queue size parameter.

8. The method of claim 1 wherein the network quality of service parameter comprises a cell loss parameter and the DSL quality of service parameter comprises a channel margin parameter.

9. The method of claim 1 wherein the network quality of service parameter comprises a cell loss parameter and the DSL quality of service parameter comprises an interleave delay parameter.

10. The method of claim 1 wherein the network quality of service parameter comprises a cell loss parameter and the DSL quality of service parameter comprises a path selection parameter.

11. The method of claim 1 wherein the request comprises a request to establish a video connection.

12. The method of claim 1 wherein the request comprises a request to establish a voice connection.

13. The method of claim 1 wherein the request comprises a request to establish a data connection.

14. A system for providing quality of service in a DSL network that establishes plural types of connections with one or more Internet network end points, the system comprising:
  a DSLAM interfaced with the Internet, the DSLAM supporting interfaces between one or more DSL end points and one or more Internet end points;
  a quality of service map associated with the DSLAM, the quality of service map relating DSL quality of service parameters with Internet network quality of service parameters; and
  a mapping engine associated with the DSLAM and the quality of service map, the mapping engine operable to apply the quality of service map to map an Internet network quality of service parameter to a DSL quality of service parameter according to the type of connection established between the DSL network and the one or more Internet end points, wherein the mapping operation correlates the DSL quality of service parameter to layer 2 and layer 3 network quality of service parameters, and wherein the layer 2 and layer 3 network quality of service parameters comprise at least one of cell delay, cell delay variation, and cell loss, and wherein the DSLAM determines the network quality of service by determining if a connection request is from a network having a layer 3 IP quality of service or a layer 2 ATM quality of service.

15. The system of claim 14 wherein the Internet network quality of service parameter comprises an IP quality of service parameter.

16. The system of claim 14 wherein the Internet network quality of service parameter comprises an ATM quality of service parameter.

17. The system of claim 14 wherein the Internet network quality of service parameter comprises a cell delay parameter and the DSL quality of service parameter comprises a bit rate parameter.

18. The system of claim 14 wherein the Internet network quality of service parameter comprises a cell delay parameter and the DSL quality of service parameter comprises a latency delay parameter.

19. The system of claim 14 wherein the Internet network quality of service parameter comprises a cell delay parameter and the DSL quality of service parameter comprises a path selection parameter.

20. The system of claim 14 wherein the Internet network quality of service parameter comprises a cell delay parameter and the DSL quality of service parameter comprises a queue size parameter.

21. The system of claim 14 wherein the Internet network quality of service parameter comprises a cell loss parameter and the DSL quality of service parameter comprises a channel margin parameter.

22. The system of claim 14 wherein the Internet network quality of service parameter comprises a cell loss parameter and the DSL quality of service parameter comprises an interleave delay parameter.

23. The system of claim 14 wherein the Internet network quality of service parameter comprises a cell loss parameter and the DSL quality of service parameter comprises a path selection parameter.

24. The system of claim 14 wherein the type of connection comprises a video connection.

25. The system of claim 14 wherein the type of connection comprises a voice connection.

26. The system of claim 14 wherein the type of connection comprises a data connection.

27. A method for provisioning a service to a network, the network having end users interfaced with the Internet by a DSLAM, the service associated with a connection type, a DSL quality of service parameter and one or more Internet quality of service parameters, the method comprising:
   storing a map that associates the connection type with one or more Internet quality of service parameters and one or more DSL quality of service parameters;
   configuring the DSLAM to determine requests for the connection type;
   referencing the map to associate the determined connection type request with the Internet quality of service parameter and the DSL quality of service parameter, wherein the mapping operation correlates the DSL quality of service parameter to layer 2 and layer 3 network quality of service parameters, and wherein the layer 2 and layer 3 network quality of service parameters comprise at least one of cell delay, cell delay variation, and cell loss, and wherein the Internet quality of service parameter is determined by determining if the requests are from a network having a layer 3 IP quality of service or a layer 2 ATM quality of service; and
   establishing the connection with the DSL quality of service parameter and the Internet quality of service parameter.

28. The method of claim 27 wherein the connection type comprises a voice packet flow.

29. The method of claim 27 wherein the connection type comprises a video packet flow.

30. The method of claim 27 wherein the Internet quality of service parameter comprises a layer 3 IP quality of service parameter.

31. The method of claim 27 wherein the Internet quality of service parameter comprises a layer 2 ATM quality of service parameter.

* * * * *